F. HEATH.
SARDINE PREPARING APPARATUS AND METHOD.
APPLICATION FILED JAN. 21, 1918.
1,361,255.
Patented Dec. 7, 1920.
4 SHEETS—SHEET 1.
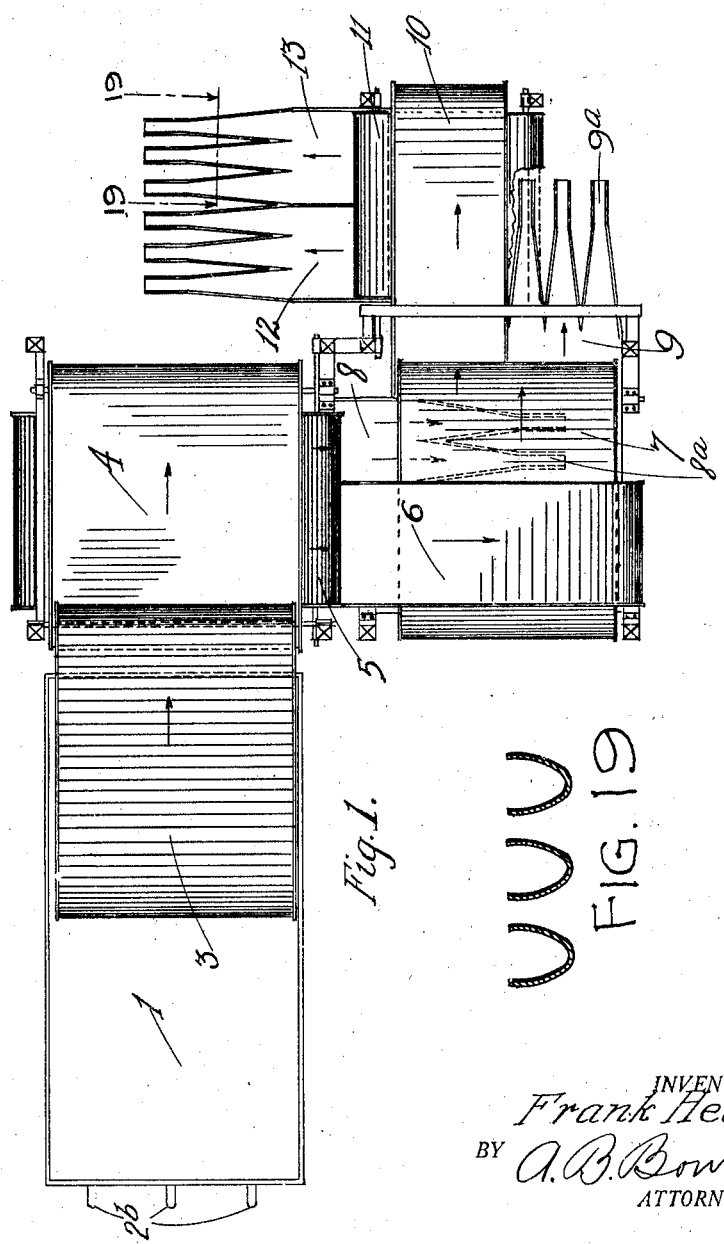
INVENTOR
Frank Heath.
BY A. B. Bowman
ATTORNEY F. HEATH.
SARDINE PREPARING APPARATUS AND METHOD.
APPLICATION FILED JAN. 21, 1918.
1,361,255.
Patented Dec. 7, 1920.
4 SHEETS—SHEET 2.
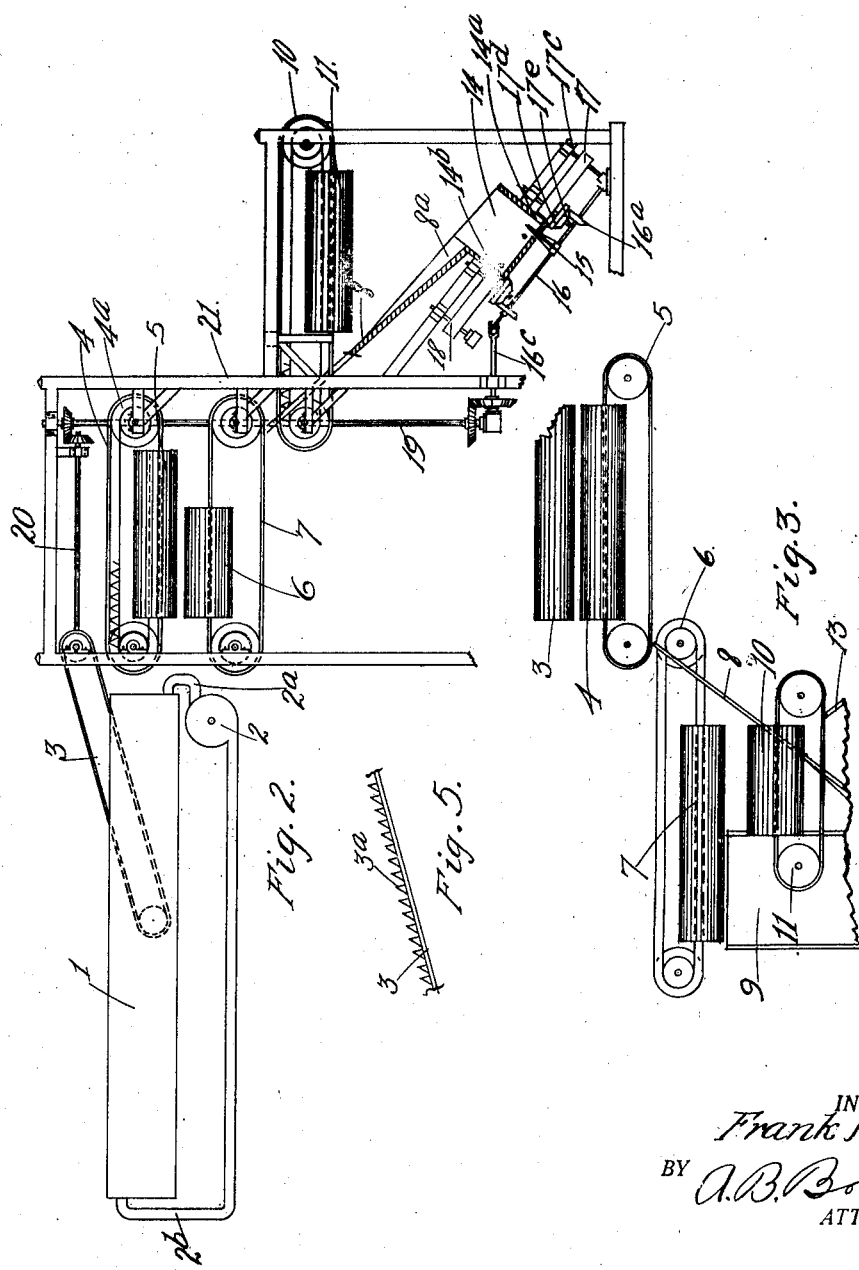
INVENTOR.
Frank Heath.
BY A. B. Bowman
ATTORNEY F. HEATH.
SARDINE PREPARING APPARATUS AND METHOD.
APPLICATION FILED JAN. 21, 1918.
1,361,255.
Patented Dec. 7, 1920.
4 SHEETS—SHEET 3.
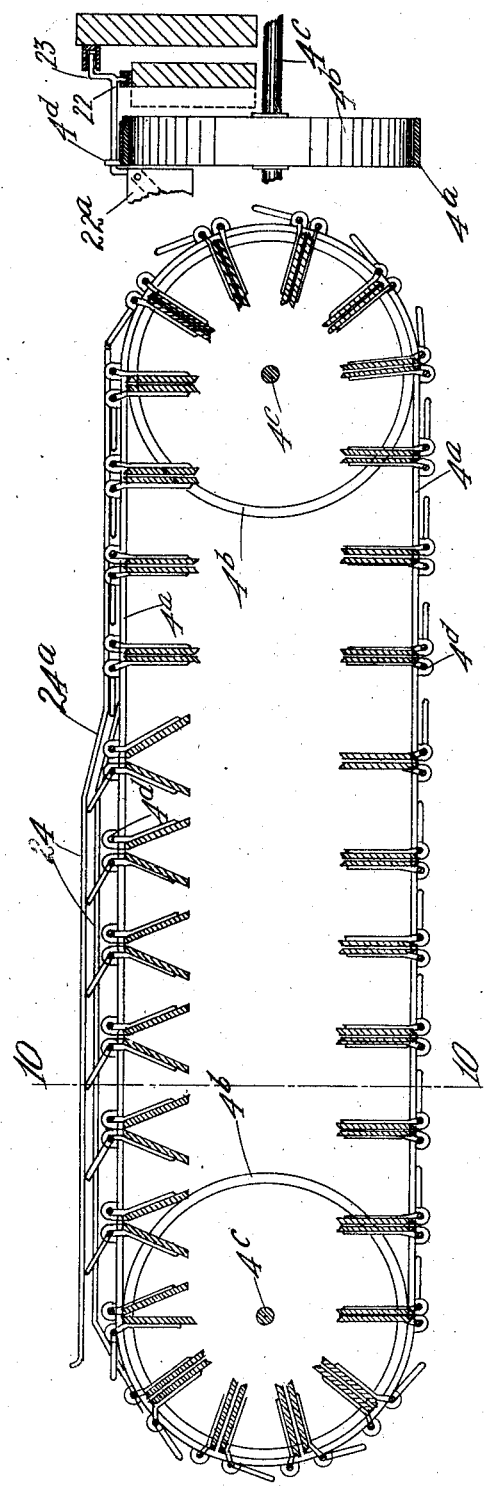
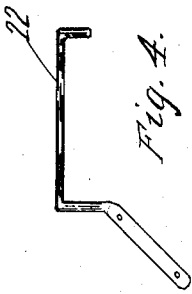
INVENTOR
Frank Heath
BY A. B. Bowman
ATTORNEY

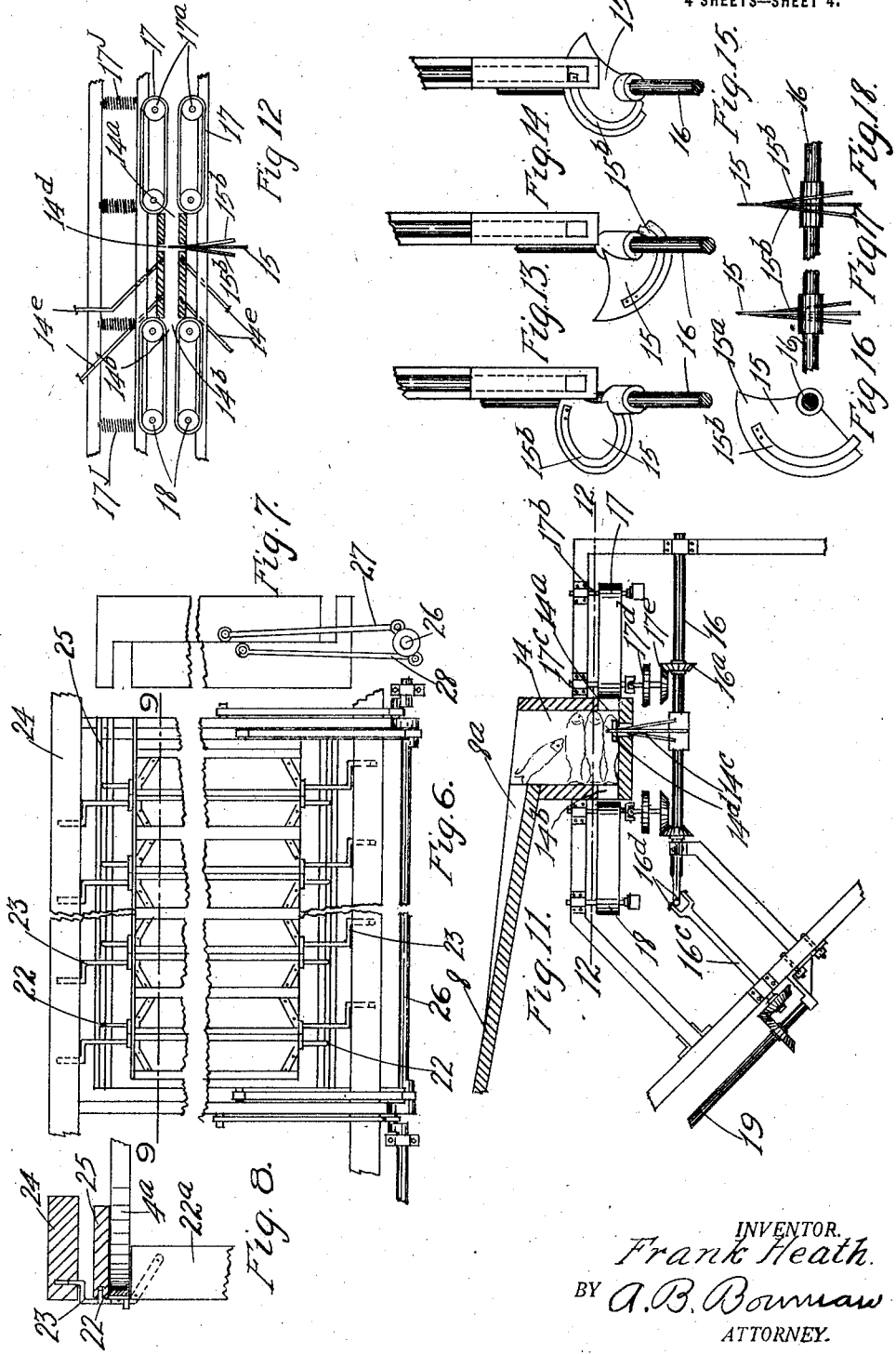

UNITED STATES PATENT OFFICE.

FRANK HEATH, OF NATIONAL CITY, CALIFORNIA.

SARDINE-PREPARING APPARATUS AND METHOD.

1,361,255.    Specification of Letters Patent.    Patented Dec. 7, 1920.

Application filed January 21, 1918. Serial No. 212,874.

*To all whom it may concern:*

Be it known that I, FRANK HEATH, a citizen of the United States, residing at National City, in the county of San Diego and State of California, have invented certain new and useful Improvements in Sardine-Preparing Apparatus and Methods, of which the following is a specification.

My invention relates to an apparatus to be use for preparing sardines for canning purposes and the objects of my invention are: first, to provide an apparatus of this class which selects and divides the sardines into different sizes; second, to provide an apparatus of this class by means of which the sardines are moved in one direction, head first, and positioned on their backs; third, to provide an apparatus of this class, with means for beheading and cleaning the sardines; fourth, to provide an apparatus of this class with means for scaling said sardines; fifth, to provide an apparatus of this class with combined means for selecting and dividing the sardines into different sizes; with means for moving them in one direction, head first and with means for be-heading, cleaning and scaling the same and for placing them properly sized into separate piles or receptacles ready to be placed into the cans, and sixth, to provide an apparatus of this class which is simple, and economical of construction, durable, automatic in its operations and will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this specification, in which:

Figure 1 is a top or plan view of the apparatus showing portions broken away and minus part of the details, to facilitate the illustration. Fig. 2 is a side elevational view of the same, showing portions broken away and showing additional details. Fig. 3 is a fragmentary front elevational view, showing some of the parts and portions. Fig. 4 is a detailed perspective view of one of the section supports 22. Fig. 5 is a fragmentary detailed side view of the belt conveyer 3 which operates from the supply tank. Fig. 6 is a fragmentary top or plan view of the selecting conveyers 4, 6, and 10 and their operating mechanism. Fig. 7 is a fragmentary end view of a portion thereof. Fig. 8 is a fragmentary end view of the opposite end thereof showing portions in section to facilitate the illustration. Fig. 9 is a sectional view of one of the selecting conveyers shown through 9—9 of Fig. 6. Fig. 10 is a fragmentary sectional view through 10—10 of Fig. 9. Fig. 11 is a partial, sectional and elevational view of the sardine be-heading and cleaning apparatus on an enlarged scale and showing its operating mechanism in connection therewith. Fig. 12 is a sectional view through 12—12 of Fig. 11, and showing the sardine scaling means in connection therewith. Figs. 13, 14 and 15 are end elevational views of the be-heading device shown without the conveyers and showing various positions of the be-heading knife in its operation. Fig. 16 is a side elevational view of said knife. Fig. 17 is a front view thereof, Fig. 18 is a rear view thereof, and Fig. 19 is a sectional view through 19—19 of Fig. 1, on a larger scale.

Similar characters of reference refer to similar parts throughout the several views of the drawings.

The tank 1, pump 2, conveyer 3, selecting conveyer 4, carrier conveyer 5, selecting conveyer 6, carrier conveyer 7, slide 8, slide 9, selecting conveyer 10, carrier conveyer 11, slides 12 and 13, be-heading box 14, be-heading knife 15, shaft 16, head conveyer belt 17, body conveyer belts 18, vertical shaft 19, main drive shaft 20, frame 21, selector controls 22, selector controls 23, selector control guide 24, selector control guide 25, selector drive shaft 26, and connecting rods 27 and 28, constitute the principal parts of my sardine preparing apparatus.

The sardine receiving tank 1, is preferably a rectangularly shaped tank filled nearly full of water. It is provided with a plurality of exit pipes $2^a$, and inlet pipes $2^b$, the extended ends of which join and connect with a centrifugal pump 2, which pump is actuated by any means desired. This pump 2 and pipes $2^a$ and $2^b$ are for the purpose of keeping the surface of the water moving toward one end of the tank at all times. Mounted so that the one end is submerged in the water in the tank and the other end extended out over the top edge of the end of the tank is a conveyer 3 preferably composed of a pair of belts with transverse slats 3ª as shown best in Fig. 5 adapted to catch the sardines floating on the top of the water and against the same and conveying them out of the tank and dropping them onto the selecting conveyer 4. This selecting conveyer 4 consists of a pair of belts 4ª mounted on wheels 4ᵇ at opposite ends of the conveyer, which wheels are mounted on shafts 4ᶜ, and each of these belts is provided with a plurality of lugs 4ᵈ secured thereto. Shiftably mounted in part of these lugs are the selector supports 22, shaped as shown best in Figs. 4, 6, 8 and 10 of the drawings, and secured to the inwardly extended end of each of these supports 22, is a slat 22ª, to the opposite end of which is secured one of the supports 23, shaped as shown best in Figs. 6, 8, and 10 of the drawings. The outwardly extending ends of the supports 22 are bent at right angles and they are mounted in grooves in the guides 25, which guides are shifted sidewise relatively to each other as shown best in Fig. 7 of the drawings by means of the crank shaft 26 and connecting rods 27 and 28. It will be noted that each alternate slat 22ª is provided on opposite ends with these supports 22 and on the opposite ends from the support 22 with the supports 23 so that the alternate slats move longitudinally in opposite directions to each other. Secured along the opposite sides of the selector conveyers are guides 24 between which the extended ends of the supports 23 are guided in their movement, it will be noted that these supports 23 serve as cranks for properly positioning the slats as shown best in Figs. 9 and 10 of the drawings, so that when the sardines pass from the conveyer 3 onto the selector conveyer 4 the moving slats are held, spaced slightly from each other over a portion of the upper flight of the conveyer, thus preventing the larger sardines from passing through, and that the guides drop at point 24ª thus spreading these slats as shown best in Fig. 9 of the drawings permitting all the remainder of the sardines to drop through onto the conveyer 5 which are too large to pass through between the slats before it reached the point 24ª, so that the small sardines are dropped onto one side of the belt 5 and the larger ones onto the other side of said belt. These slats are moved endwise relatively to each other to facilitate their proper selection by said selecting conveyer. The carrier conveyer 5 is mounted between the upper and lower flights of the conveyer 4 and is adapted to carry the large sardines from the conveyer 4 onto the slide 8, while the smaller ones are dropped onto another selector 6 constructed the same as the selector 4. The large sardines when sliding on the slide 8 will turn so that they each go headforemost by reason of their tail being adhesive and engaging the surface of the slide and turning them so that each goes head first. The lower end of the slide 8 is formed into chutes 8ª provided with curved surface bottoms and converging sides converging to the width of the selected sardine adapted to turn the sardines onto their backs by reason of gravity, their backs being considerably heavier, the sardines on the slides 8 therefore are turned headforemost and in the chutes 8ª are turned on their backs and slide downwardly into the box 14 where they are be-headed as will be hereinafter described. The smaller sardines passing from the selector 4 onto the selector 6 are again selected in the same manner as hereinbefore described so that the larger sardines go onto the slide 9 and the smaller ones onto another selecting conveyer 10, by means of the carrier conveyer 7, the larger sardines being properly positioned and slid into the chute as hereinbefore described and the smaller sardines are again selected by means of selecting conveyer 10 the same as hereinbefore described and the two different sizes carried by means of the carrier conveyer 11 to the slides 12 and 13 where they are properly positioned headforemost and on their backs as hereinbefore described. It will be here noted that this selecting apparatus may be carried out to as many different selectors as desired, providing for different varieties and sizing of several different sizes of sardines and that the selecting conveyers, carrying conveyers and slides are of similar structure and operation except for size or width to accommodate their arrangement and relative positions. These conveyers are preferably operated by means of the shafts 19 and 20 and may be speeded to different speeds in accordance with the size of bevel gears on the various conveyer shafts. At the lower end of each of the chutes leading from the slides there is provided a scaling and be-heading device which consists of a narrow box 14 of approximately the width of the sardines selected for this particular slide and the sardines enter this box 14 and lie on their backs one upon the other in said boxes, as shown best in Fig. 11. These boxes 14 are provided with holes 14ª and 14ᵇ near their lower sides at both front and back and mounted just in front of the hole 14ª is a conveyer consisting of belts 17 mounted on sheaves 17ª which sheaves are mounted on shafts 17ᵇ and 17ᶜ, supported normally in vertical positions and the lower ends of the shaft 17ᶜ are operatively connected together by means of gears 17ᵈ and on one of said shafts is secured a beveled gear 17ᵉ which engages another beveled gear 16ª on the shaft 16, these belts 17 are for the purpose of carrying the sardine heads together with the other refuse away from the be-heading box. Mounted at the other end is the belt 18, which is similarly constructed and operated and it is for the purpose of carrying the body of the sardine backwardly away from the be-heading box. In the lower edge of this box 14 is a slot 14ᶜ and a cross slot 14ᵈ adapted for the be-heading knife 15 to pass through. This be-heading knife 15 is secured rigidly on the shaft 16 and is segmental in shape, provided with a sharp front edge 15ᵃ and it is provided with outwardly extending arms 15ᵇ on opposite sides which are adapted to spread the head from the body after the head has been severed by the knife edge 15ᵃ, until the head is engaged by the belts 17 and the tail is engaged by the belts 18 which carry them away. It will be here noted that the be-heading knife 15 is so positioned that the lower portion of the neck is not cut but is torn apart by the spreading action of the members 15ᵇ of the knife, so that the head carries with it the entrails or insides of the sardine. The belts 17 and 18 and their operating mechanism are supported relatively to each other by means of compression springs 17ᵗ which provides resiliency for permitting the pairs of belts to spread slightly but tending to hold them tight against the fish part for conveying the same. Mounted in the sides of the box 14 and in line with the middle of the sardine to be be-headed are a plurality of pipes 14ᵉ, which extend to a source of water supply, preferably an elevated tank and serve to jet water against the side of the sardine toward its head for removing the scales.

The shaft 16 is operated by means of another shaft 16ᶜ connected by toggle-joint 16ᵈ and this shaft 16ᶜ is operated through beveled gears by the main operating shaft 19. It will be here noted that the various shafting and gears may be supplemented by other means of transmitting the powers to the various operating members without departing from the principle of the invention and that the frame work and structure may be modified to suit, it serving only as a support for the various operating mechanism.

Though I have shown and described a particular construction, combination and arrangement of parts, I do not wish to be limited to this particular construction, combination and arrangement but desire to include within the purview of my invention the construction, combination and arrangement substantially as set forth in the appended claims.

It is obvious that with this construction there is provided an apparatus for preparing sardines preparatory for canning in which the sardines are selected into different sizes for different cans; that they are turned headforemost and on their backs; that they are scaled, be-headed and cleaned in receptacles of the proper size to conform to the different sized sardines; that all of the different functions are performed by coöperation of the various members of the apparatus performing their different functions. That the structure as a whole is simple, and economical of construction, durable, easy to install, automatic in its operation and delivers the sardines in various sizes, scaled, be-headed and cleaned.

Having thus described my invention, what I claim as new and desire to secure by Letters Patent is:

1. In an apparatus of the class described, means for turning sardines on their backs comprising an incline, downwardly, differently and gradually curved bottomed chute with its walls converging toward the exit.

2. In an apparatus of the class described, means for selecting sardines into different groups of different sizes, from a miscellaneous bulk and means coöperating therewith for turning said sardines so that they all move headforemost on their backs.

3. In an apparatus of the class described, means for turning sardines so that they all move headforemost and on their backs comprising an inclined flat surface and an inclined, downwardly, differently and gradually curved bottomed chute with its walls converging toward the exit connected therewith.

4. In an apparatus of the class described a means for be-heading and cleaning sardines comprising an inclined chute, a receptacle of the proper width to receive the sardines singly; a revolubly mounted knife adapted to engage the neck of the sardine and sever a portion thereof and provided with inclined members adapted to separate the head from the body, carrying with it the entrails.

5. In an apparatus of the class described a means for be-heading and cleaning sardines comprising an inclined chute; a receptacle of the proper width to receive the sardines singly; a revolubly mounted knife adapted to engage the neck of the sardine and sever a portion thereof and provided with inclined members adapted to separate the head from the body, carrying with it the entrails from the body, carrying with it the entrails and means for engaging the head and body portion of the sardine and conducting them from said be-heading receptacle.

6. In an apparatus of the class described, means for scaling sardines comprising a receptacle of the proper width for the sardines to lie in singly; means for moving the body of the sardine, tail first; a plurality of jets positioned on an angle toward the head of the sardine.

7. In an apparatus of the class described means for turning sardines, for movement headforemost and on their backs comprising an inclined member and means for scaling said sardines comprising a plurality of jets adapted to engage said sardines on an angle toward their heads.

8. The herein described method of preparing sardines for canning purposes, consisting in mechanically selecting said sardines into different size groups, then mechanically turning them so that they move headforemost, then mechanically turning them onto their backs.

In testimony whereof, I have hereunto set my hand at San Diego, California this 12th day of January 1918.

FRANK HEATH.